United States Patent
Nakayama

(10) Patent No.: US 9,614,223 B2
(45) Date of Patent: Apr. 4, 2017

(54) ANODE ACTIVE MATERIAL, SODIUM ION BATTERY AND LITHIUM ION BATTERY

(71) Applicant: TOYOTA JIDOSHA KABUSHIKI KAISHA, Toyota-shi, Aichi-ken (JP)

(72) Inventor: Hideki Nakayama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/844,957

(22) Filed: Sep. 3, 2015

(65) Prior Publication Data

US 2016/0087273 A1   Mar. 24, 2016

(30) Foreign Application Priority Data

Sep. 19, 2014 (JP) .................................. 2014-191092
Jun. 17, 2015 (JP) .................................. 2015-121854

(51) Int. Cl.
*H01M 4/485* (2010.01)
*C01G 33/00* (2006.01)
*H01M 10/054* (2010.01)
*H01M 10/0525* (2010.01)

(52) U.S. Cl.
CPC ............ *H01M 4/485* (2013.01); *C01G 33/00* (2013.01); *C01P 2002/72* (2013.01); *C01P 2002/77* (2013.01); *C01P 2006/40* (2013.01); *H01M 10/054* (2013.01); *H01M 10/0525* (2013.01)

(58) Field of Classification Search
CPC ............ H01M 4/485; H01M 10/054; H01M 10/0525; C01G 33/00; C01P 2006/40; C01P 2002/72; C01P 2002/77
See application file for complete search history.

(56) References Cited

U.S. PATENT DOCUMENTS

| 2010/0248022 | A1 | 9/2010 | Shirakata et al. |
| 2011/0104551 | A1 | 5/2011 | Yang et al. |
| 2012/0132267 | A1* | 5/2012 | Shinohara ............ H01G 9/2027 136/256 |

FOREIGN PATENT DOCUMENTS

| JP | 2001-052701 A | 2/2001 |
| JP | 2010231958 A | 10/2010 |

OTHER PUBLICATIONS

Ikeda, Shigeru et al., "Effect of the particle size for photocatalytic decomposition of water on Ni-loaded K4Nb6O17", Microporous Materials, 1997, vol. 9, pp. 253-258.

Zhang et al., Cyclic Voltammetric Behavior of Methyl Viologen Intercalated into Layered K4Nb6O17 Modified Glass Carbon Electrode, Journal of Huaihai Institute of Technology, Natural Science Edition, vol. 17, No. 2, pp. 47-50, Jun. 2008.

* cited by examiner

*Primary Examiner* — Laura Weiner
(74) *Attorney, Agent, or Firm* — Oliff PLC

(57) ABSTRACT

The present invention aims to provide an anode active material which may intend to improve safety of a battery. The object is attained by providing an anode active material being used for a sodium ion battery or a lithium ion battery, wherein the anode active material has an $A_4Nb_6O_{17}$ phase (A is at least one kind of H, Na and K).

3 Claims, 3 Drawing Sheets

ANODE ACTIVE MATERIAL, SODIUM ION BATTERY AND LITHIUM ION BATTERY

TECHNICAL FIELD

The present invention relates to an anode active material which may intend to improve safety of a battery.

BACKGROUND ART

A lithium ion battery is a battery such that an Li ion moves between a cathode and an anode. The lithium ion battery has the advantage that energy density is high. In contrast, a sodium ion battery is a battery such that an Na ion moves between a cathode and an anode. Na exists so abundantly as compared with Li that the sodium ion battery has the advantage that lower costs are easily intended as compared with the lithium ion battery. Generally, these batteries have a cathode active material layer containing a cathode active material, an anode active material layer containing an anode active material, and an electrolyte layer formed between the cathode active material layer and the anode active material layer.

It is known that a carbon material is used as an anode active material used for these batteries. For example, in Patent Literature 1, a nonaqueous electrolyte secondary battery is disclosed, in which lithium iron phosphate represented by $Li_xFePO_4$ is used as a cathode active material and a carbon material such that average action potential is 0.3 V or less on the basis of lithium is used as an anode active material.

Incidentally, in Non Patent Literature 1, $K_4Nb_6O_{17}$ is disclosed as a photocatalyst material. Also, in Patent Literature 2, an electrode for a lithium secondary battery containing $Li_4Nb_6O_{17}$ as an active material for an electrode is disclosed.

CITATION LIST

Patent Literature

Patent Literature 1: Japanese Patent Application Publication (JP-A) No. 2010-231958
Patent Literature 2: JP-A No. 2001-052701 Non Patent Literature
Non Patent Literature 1: Shigeru Ikeda et al., "Effect of the particle size for photocatalytic decomposition of water on Ni-loaded $K_4Nb_6O_{17}$", Microporous Materials 9 (1997) 253-258

SUMMARY OF INVENTION

Technical Problem

For example, with regard to the carbon material described in Patent Literature 1, average action potential is 0.3 V or less on the basis of lithium, so that the problem is that metal Li is easily precipitated. Also, examples of an anode material useful for a sodium ion battery include hard carbon, which is around 0 V in average action potential, so that the problem is that metal Na is easily precipitated. Thus, action potential of an anode active material is so low that metal is easily precipitated on the surface of the anode active material, so that the problem is that it is difficult to secure the safety of a battery.

The present invention has been made in view of the above circumstances, and a main object thereof is to provide an anode active material which can improve the safety of a battery.

Solution to Problem

In order to achieve the problems, the present invention provides an anode active material used for a sodium ion battery or a lithium ion battery, wherein the anode active material has an $A_4Nb_6O_{17}$ phase (A is at least one kind of H, Na and K).

According to the present invention, the $A_4Nb_6O_{17}$ phase acts at comparatively high electric potential, so that an improvement in safety of the battery may be intended.

In the invention, the A is preferably K.
In the invention, the A is preferably Na or H.
The present invention also provides a sodium ion battery comprising a cathode active material layer containing a cathode active material, an anode active material layer containing an anode active material, and an electrolyte layer formed between the cathode active material layer and the anode active material layer, wherein the anode active material is the anode active material described above.

According to the present invention, the use of the anode active material described above allows the sodium ion battery with high safety.

The present invention further provides a lithium ion battery comprising a cathode active material layer containing a cathode active material, an anode active material layer containing an anode active material, and an electrolyte layer formed between the cathode active material layer and the anode active material layer, wherein the anode active material is the anode active material described above.

According to the present invention, the use of the anode active material described above allows the lithium ion battery with high safety.

Advantageous Effects of Invention

An anode active material of the present invention produces the effect to improve the safety of the battery.

DESCRIPTION OF EMBODIMENTS

Figure 1:
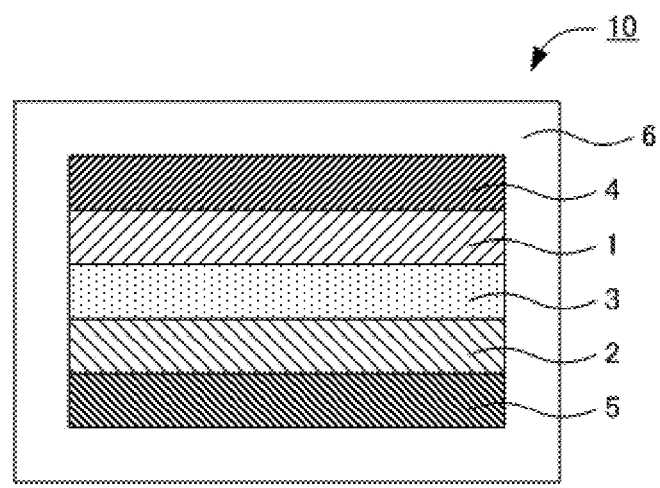
FIG. 1 is a schematic cross-sectional view showing an example of a sodium ion battery or a lithium ion battery of the present invention.

An anode active material, a sodium ion battery and a lithium ion battery of the present invention are hereinafter described in detail.

A. Anode Active Material

The anode active material of the present invention is an anode active material used for a sodium ion battery or a lithium ion battery, wherein the anode active material has an $A_4Nb_6O_{17}$ phase (A is at least one kind of H, Na and K).

According to the present invention, the $A_4Nb_6O_{17}$ phase acts at comparatively high electric potential, so that an improvement in safety of the battery may be intended. For example, in the after-mentioned Example 1, it was confirmed that action potential of the anode active material having a $K_4Nb_6O_{17}$ phase was in the vicinity of 1 V. The action potential in the vicinity of 1 V is such a moderate electric potential as the anode active material as to have the advantage that battery voltage may be increased while restraining metal Na or metal Li from precipitating. Also, the anode active material of the present invention has the advantage that heat resistance is favorable by reason of being ordinarily an oxide active material.

On the other hand, in Non Patent Literature 1, $K_4Nb_6O_{17}$ is described but no description nor suggestion is made about an active material. Also, in Patent Literature 2, an electrode for a lithium secondary battery using $Li_4Nb_6O_{17}$, not $K_4Nb_6O_{17}$, as an active material is disclosed. Also, in recent years, research and development of a sodium ion battery have been actively conducted, and various materials have been proposed for a cathode active material; however, hard carbon has been reported at most for an anode active material. In the present invention, it has been first found out that an oxide with Nb, that is, the $A_4Nb_6O_{17}$ phase is useful as the anode active material for a sodium ion battery or a lithium ion battery.

The anode active material of the present invention has the $A_4Nb_6O_{17}$ phase. An A element in the $A_4Nb_6O_{17}$ phase is at least one kind of an H element, an Na element and a K element. The A element may be one kind of an H element, an Na element and a K element, or two kinds or more thereof. The case where the A element is an H element or an Na element has the advantage that reversible capacitance increases as compared with the case of being a K element. The presence of the $A_4Nb_6O_{17}$ phase may be confirmed by X-ray diffraction (XRD) measurement. Ordinarily, the $A_4Nb_6O_{17}$ phase preferably has typical peaks in 2θ=10.01°, 12.89°, 14.68°, 15.67°, 17.63°, 23.30°, 25.10°, 27.60°, 30.20°, 40.50° and 46.40° in X-ray diffraction measurement using a CuKα ray. Incidentally, the peak position may be within a range of ±2.00° or within a range of ±1.00°. The space group of the $A_4Nb_6O_{17}$ phase is preferably P21nb. Also, the crystal system of the $A_4Nb_6O_{17}$ phase is preferably an orthorhombic crystal.

Also, the anode active material of the present invention is preferably large in the ratio of the $A_4Nb_6O_{17}$ phase; specifically, the anode active material preferably contains the $A_4Nb_6O_{17}$ phase mainly. Here, "containing the $A_4Nb_6O_{17}$ phase mainly" signifies that the ratio of the $A_4Nb_6O_{17}$ phase is the largest in all crystal phases contained in the anode active material. The ratio of the $A_4Nb_6O_{17}$ phase contained in the anode active material is preferably 50 mol % or more, more preferably 60 mol % or more, and even more preferably 70 mol % or more. Also, the anode active material of the present invention may include only the $A_4Nb_6O_{17}$ phase (a single-phase active material). Incidentally, the ratio of the $A_4Nb_6O_{17}$ phase contained in the anode active material may be determined by a quantitative analysis method through X-ray diffraction (such as a quantification method by R-value and a Rietveld method), for example.

The anode active material of the present invention contains an A element, an Nb element and an O element, and has the $A_4Nb_6O_{17}$ phase described above. The composition of the anode active material of the present invention is not particularly limited if the composition has the crystal phase described above. Above all, the anode active material of the present invention preferably has a composition of $A_4Nb_6O_{17}$ and the adjacent thereof. Specifically, the anode active material preferably has a composition of $A_xNb_yO_z$ (3≤x≤5, 5≤y≤7, 16≤z≤18).

The shape of the anode active material of the present invention is preferably a particulate shape, for example. Also, the average particle diameter thereof ($D_{50}$) is preferably, for example, from 1 nm to 100 μm, above all, from 10 nm to 30 μm.

Also, a method for producing the anode active material of the present invention is not particularly limited if the method is such as to allow the anode active material described above, but examples thereof include a solid-phase method, a sol-gel method, a spray-drying method, an atomized pyrolysis method, a hydrothermal method and a coprecipitation method. Also, the anode active material having an $H_4Nb_6O_{17}$ phase may be obtained by substituting part or all of the K element of the anode active material having a $K_4Nb_6O_{17}$ phase with an H element, for example. Also, the anode active material having an $Na_4Nb_6O_{17}$ phase may be obtained by substituting part or all of the H element of the anode active material having an $H_4Nb_6O_{17}$ phase with an Na element, for example. Examples of a substitution method include an ion exchange method.

B. Sodium Ion Battery

FIG. 1 is a schematic cross-sectional view showing an example of a sodium ion battery of the present invention. A sodium ion battery 10 shown in FIG. 1 comprises a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. The anode active material layer 2 contains the anode active material described in the "A. Anode active material".

According to the present invention, the use of the anode active material described above allows the sodium ion battery with high safety.

The sodium ion battery of the present invention is hereinafter described in each constitution.

1. Anode Active Material Layer

The anode active material layer in the present invention is a layer containing at least the anode active material. The anode active material layer may contain at least one of a conductive material, a binder and a solid electrolyte material in addition to the anode active material.

The anode active material in the present invention is ordinarily the anode active material described in the "A. Anode active material". The content of the anode active material is preferably larger from the viewpoint of capacity;

preferably, for example, from 60% by weight to 99% by weight, above all, from 70% by weight to 95% by weight.

Examples of the conductive material include a carbon material. Specific examples of the carbon material include acetylene black, Ketjen Black, VGCF and graphite. The content of the conductive material is preferably, for example, from 5% by weight to 80% by weight, above all, from 10% by weight to 40% by weight.

Examples of the binder include polyvinylidene difluoride (PVDF), polyimide (PI), carboxymethyl cellulose (CMC) and styrene-butadiene rubber (SBR). The content of the binder is preferably, for example, from 1% by weight to 40% by weight.

The solid electrolyte material is not particularly limited as long as the material has desired ion conductivity, but examples thereof include an oxide solid electrolyte material and a sulfide solid electrolyte material. The content of the solid electrolyte material is preferably, for example, from 1% by weight to 40% by weight.

The thickness of the anode active material layer varies greatly with the constitution of the battery, and is preferably from 0.1 μm to 1000 μm, for example.

2. Cathode Active Material Layer

The cathode active material layer in the present invention is a layer containing at least the cathode active material. The cathode active material layer may contain at least one of a conductive material, a binder and a solid electrolyte material in addition to the cathode active material.

Examples of the cathode active material include bed type active materials, spinel type active materials, and olivine type active materials. Examples of the cathode active material include an oxide active material. Specific examples of the cathode active material include $NaFeO_2$, $NaNiO_2$, $NaCoO_2$, $NaMnO_2$, $NaVO_2$, $Na(Ni_xMn_{1-x})O_2$ (0<X<1), $Na(Fe_xMn_{1-x})O_2$ (0<X<1), $NaVPO_4F$, $Na_2FePO_4F$, $Na_3V_2(PO_4)_3$, and $Na_4M_3(PO_4)_2P_2O_7$ (M is at least one kind of Co, Ni, Fe and Mn).

The kinds and content of the conductive material, the binder and the solid electrolyte material used for the cathode active material layer are the same as the contents described in the anode active material layer described above; therefore, the description herein is omitted. The thickness of the cathode active material layer varies greatly with the constitution of the battery, and is preferably from 0.1 μm to 1000 μm, for example.

3. Electrolyte Layer

The electrolyte layer in the present invention is a layer formed between the cathode active material layer and the anode active material layer. Ion conduction between the cathode active material and the anode active material is performed through the electrolyte contained in the electrolyte layer. The form of the electrolyte layer is not particularly limited but examples thereof include a liquid electrolyte layer, a gel electrolyte layer and a solid electrolyte layer.

The liquid electrolyte layer is ordinarily a layer obtained by using a nonaqueous liquid electrolyte. The nonaqueous liquid electrolyte ordinarily contains a sodium salt and a nonaqueous solvent. Examples of the sodium salt include inorganic sodium salts such as $NaPF_6$, $NaBF_4$, $NaClO_4$ and $NaAsF_6$; and organic sodium salts such as $NaCF_3SO_3$, $NaN(CF_3SO_2)_2$, $NaN(C_2F_5SO_2)_2$, $NaN(FSO_2)_2$ and $NaC(CF_3SO_2)_3$.

The nonaqueous solvent is not particularly limited as long as the solvent dissolves the sodium salt. Examples of the high-dielectric-constant solvent include cyclic ester (cyclic carbonate) such as ethylene carbonate (EC), propylene carbonate (PC) and butylene carbonate (BC), γ-butyrolactone, sulfolane, N-methylpyrrolidone (NMP), and 1,3-dimethyl-2-imidazolidinone (DMI). Meanwhile, examples of the low-viscosity solvent include chain ester (chain carbonate) such as dimethyl carbonate (DMC), diethyl carbonate (DEC) and ethyl methyl carbonate (EMC), acetates such as methyl acetate and ethyl acetate, and ether such as 2-methyltetrahydrofuran. A mixed solvent such that the high-dielectric-constant solvent and the low-viscosity solvent are mixed may be used.

The concentration of the sodium salt in the nonaqueous liquid electrolyte is, for example, from 0.3 mol/L to 5 mol/L, preferably from 0.8 mol/L to 1.5 mol/L. The thickness of the electrolyte layer varies greatly with kinds of the electrolyte and constitutions of the battery, and is preferably, for example from 0.1 μm to 1000 μm.

4. Other Constitutions

The sodium ion battery of the present invention ordinarily comprises a cathode current collector for collecting the cathode active material layer and an anode current collector for collecting the anode active material layer. Examples of a material for the cathode current collector include SUS, aluminum, nickel, iron, titanium and carbon. Meanwhile, examples of a material for the anode current collector include SUS, copper, nickel and carbon. Examples of the shape of the current collectors include a foil shape, a mesh shape and a porous shape. In addition, examples of a method for forming the active material layers on the current collectors include a doctor blade method, an electrostatic coating method, a dip coat method and a spray coat method.

The sodium ion battery of the present invention may include a separator between the cathode active material layer and the anode active material layer. A material for the separator may be an organic material or an inorganic material. Specific examples thereof include porous membranes such as polyethylene (PE), polypropylene (PP), cellulose and polyvinylidene fluoride. The separator may be a single-layer structure (such as PE and PP) or a laminated structure (such as PP/PE/PP). A case for a general battery may be used as a battery case. Examples of the battery case include a battery case made of SUS.

5. Sodium Ion Battery

The sodium ion battery of the present invention is not particularly limited as long as the battery has the cathode active material layer, anode active material layer and electrolyte layer described above. In addition, the sodium ion battery of the present invention may be a primary battery or a secondary battery, preferably a secondary battery among them. The reason therefor is to be repeatedly charged and discharged and be useful as a car-mounted battery, for example. The primary battery includes an application as a primary battery (an application intended to use only for one discharge). Examples of the shape of the sodium ion battery of the present invention include a coin shape, a laminate shape, a cylindrical shape and a rectangular shape. A producing method for the sodium ion battery is not particularly limited but is the same as a producing method for a general sodium ion battery.

C. Lithium Ion Battery

FIG. 1 is a schematic cross-sectional view showing an example of a lithium ion battery of the present invention. A lithium ion battery 10 shown in FIG. 1 comprises a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. The anode active material layer 2 contains the anode active material described in the "A. Anode active material".

According to the present invention, the use of the anode active material described above allows the lithium ion battery with high safety.

Incidentally, the lithium ion battery of the present invention is basically the same as the contents described in the "B. Sodium ion battery"; therefore, only different points are hereinafter described.

Examples of the cathode active material include bed type active materials, spinel type active material, and olivine type active materials. Examples of the cathode active material include an oxide active material. Specific examples of the cathode active material include $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $LiFePO_4$, $LiMnPO_4$, $LiNiPO_4$ and $LiCuPO_4$.

Examples of a supporting salt (a lithium salt) used for the electrolyte layer include inorganic lithium salts such as $LiPF_6$, $LiBF_4$, $LiClO_4$ and $LiAsF_6$; and organic lithium salts such as $LiCF_3SO_3$, $LiN(CF_3SO_2)_2$, $LiN(C_2F_5SO_2)_2$, $LiN(FSO_2)_2$ and $LiC(CF_3SO_2)_3$.

Incidentally, the present invention is not intended to be limited to the embodiment described above. The embodiment described above is given only for illustrative purposes, and any embodiment having substantially the same configuration as the technical idea described in the claims of the present invention and provides similar operating effects, is construed to be included in the technical scope of the present invention.

EXAMPLES

The present invention is described more specifically while showing examples hereinafter.

Example 1

$K_2CO_3$ and $Nb_2O_5$ as raw materials were weighed at a molar ratio of $K_2CO_3:Nb_2O_5=2:3$, and kneaded in ethanol. Thereafter, the solution was molded into pellets, which were burned in a muffle furnace on the conditions of 1000° C. and 12 hours. Thus, an active material having a composition of $K_4Nb_6O_{17}$ was obtained.

[Evaluations]
(X-Ray Diffraction Measurement)

Figure 2:
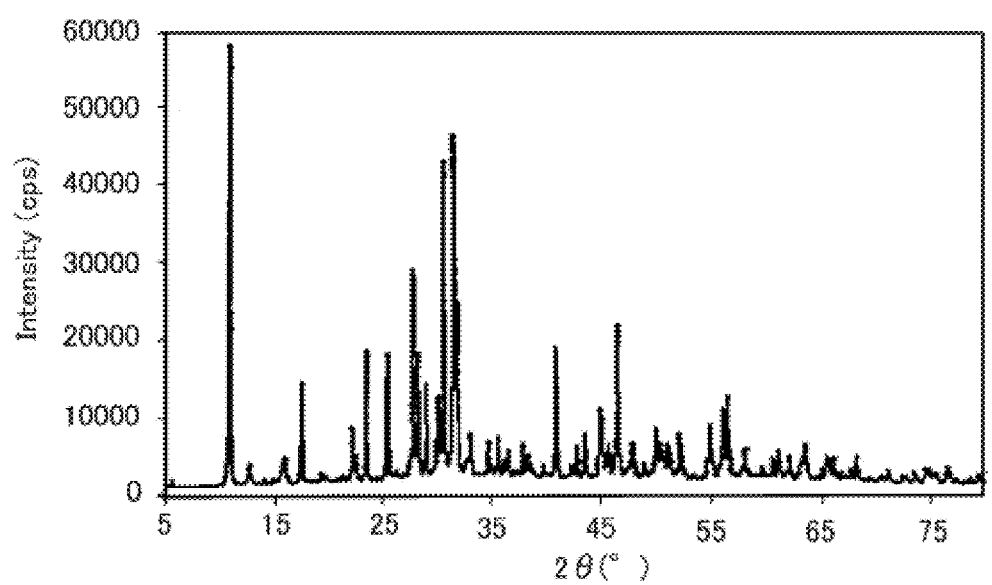
FIG. 2 is a result of measuring XRD of an active material obtained in Example 1.
Figure 3:
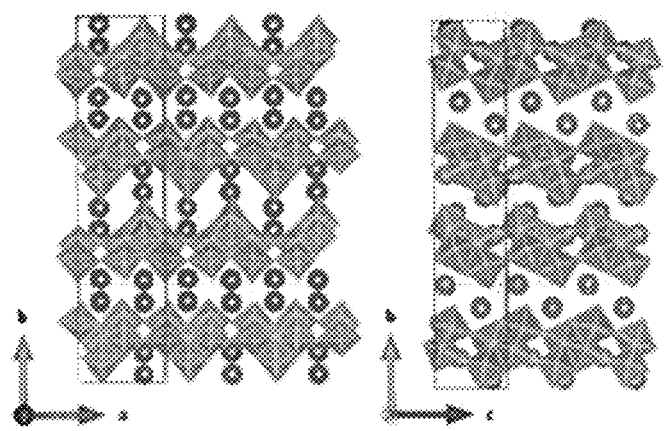
FIG. 3 is a schematic view showing a crystal structure of a $K_4Nb_6O_{17}$ phase.

X-ray diffraction (XRD) measurement by using a CuKα ray was performed for the active material obtained in Example 1. The results are shown in FIG. 2. As shown in FIG. 2, with regard to the active material obtained in Example 1, the typical peaks appeared in 2θ=10.01°, 12.89°, 14.68°, 15.67°, 17.63°, 23.30°, 25.10°, 27.60°, 30.20°, 40.50° and 46.40°, and it was confirmed that the active material contained the $K_4Nb_6O_{17}$ phase as the main body. Incidentally, FIG. 3 is a schematic view showing a crystal structure of the $K_4Nb_6O_{17}$ phase (orthorhombic crystal, space group P21nb). As shown in FIG. 3, the $K_4Nb_6O_{17}$ phase has a layer structure in which an $NbO_6$ octahedron layer and a K layer were laminated.

(Charge and Discharge Test)

An evaluation battery using the active material obtained in Example 1 was produced. First, the obtained active material, a conductive material (acetylene black), and a binder (polyvinylidene fluoride, PVDF) were mixed and kneaded at a weight ratio of active material:conductive material:binder=85:10:5 to thereby obtain a paste. Next, the obtained paste was coated on a copper foil by a doctor blade, dried and pressed to thereby obtain a test electrode having a thickness of 20 μm.

Thereafter, a CR2032-type coin cell was used, the test electrode was used as a working electrode, metallic Na was used as a counter electrode, and a porous separator of polypropylene/polyethylene/polypropylene (a thickness of 25 μm) was used as a separator. A solution in which $NaPF_6$ was dissolved at a concentration of 1 mol/L in a solvent, in which EC (ethylene carbonate) and DEC (diethyl carbonate) were mixed by the same volume, was used as a liquid electrolyte.

Next, a charge and discharge test was performed for the obtained evaluation battery. Specifically, the test was performed on the conditions of an environmental temperature of 25° C. and a voltage range of 10 mV to 2.5 V. The electric current value was determined at 3 mA/g. The results are shown in FIG. 4.

Figure 4:
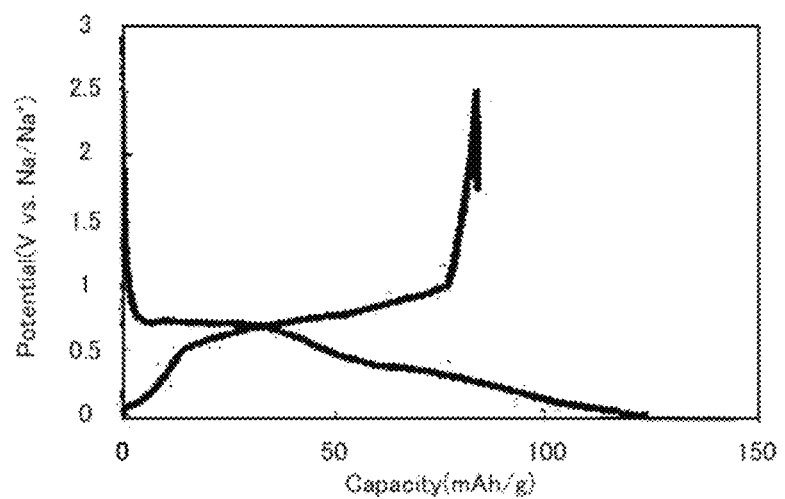
FIG. 4 is a result of a charge and discharge test of an evaluation battery (a sodium ion battery) using an active material obtained in Example 1.

As shown in FIG. 4, it was confirmed that reaction potential in accordance with the Na desorption reaction appeared in the vicinity of 0.8 V (vs $Na/Na^+$) during desorption of Na to obtain reversible capacitance of 84 mAh/g as Na desorption capacitance. Thus, it may be confirmed that the active material having the $K_4Nb_6O_{17}$ phase is useful as an anode active material of a sodium ion battery. Also, this active material acts in the vicinity of 1 V (vs $Na/Na^+$), so as to allow safety of the battery to be improved.

Also, an evaluation battery (supporting salt: $LiPF_6=1$ mol/L, solvent: EC/DMC/EMC=3/4/3) was produced in the same manner as the above by using metallic Li as a counter electrode to perform a charge and discharge test in the same manner as the above. The results are shown in FIG. 5.

Figure 5:
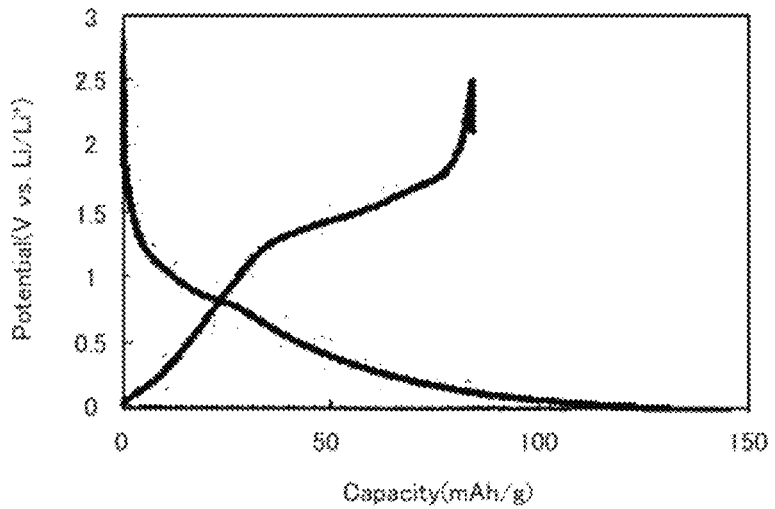
FIG. 5 is a result of a charge and discharge test of an evaluation battery (a lithium ion battery) using an active material obtained in Example 1.

As shown in FIG. 5, it was confirmed that reaction potential in accordance with the Li desorption reaction appeared in the vicinity of 1.5 V (vs $Li/Li^+$) during desorption of Li to obtain reversible capacitance of 84 mAh/g as Li desorption capacitance. Thus, it may be confirmed that the active material having the $K_4Nb_6O_{17}$ phase is useful as an anode active material of a lithium ion battery. Also, this active material acts in the vicinity of 1 V (vs $Li/Li^+$), so as to allow safety of the battery to be improved.

Example 2

The active material ($K_4Nb_6O_{17}$) obtained in Example 1 was stirred in $HNO_3$ aqueous solution of a concentration of 7 M at room temperature for 24 hours to ion-exchange K ion contained in the active material for H ion. Thus, an active material having a composition of $H_4Nb_6O_{17}$ was obtained.

Example 3

The active material ($H_4Nb_6O_{17}$) obtained in Example 2 was stirred in NaOH aqueous solution of a concentration of 1 M at room temperature for 48 hours to ion-exchange H ion contained in the active material for Na ion. Thus, an active material having a composition of $Na_4Nb_6O_{17}$ was obtained.

[Evaluations]
(Charge and Discharge Test)

Evaluation batteries (a sodium ion battery and a lithium ion battery) using the active materials obtained in Examples 2 and 3 were produced. A specific producing method is the same as Example 1. A charge and discharge test was performed for the obtained evaluation battery. Specifically, the test was performed on the conditions of an environmental temperature of 25° C. and a voltage range of 0.1 V to 2.5

V. The electric current value was determined at 3 mA/g. The results are shown in FIGS. 6 and 7.

Figure 6A:
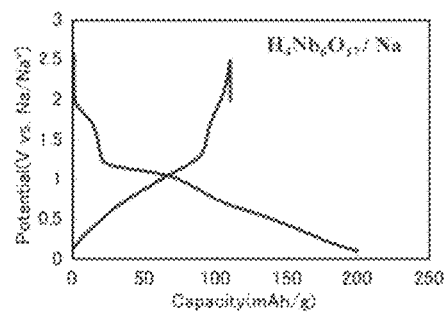
FIGS. 6A and 6B are each a result of a charge and discharge test of an evaluation battery (a sodium ion battery and a lithium ion battery) using an active material obtained in Example 2.
Figure 6B:
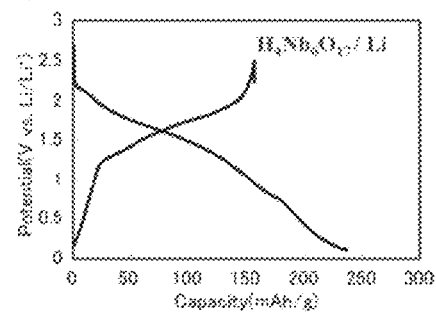

As shown in FIG. 6A, in Example 2, it was confirmed that reaction potential in accordance with the Na desorption reaction appeared in the vicinity of 0.9 V (vs Na/Na$^+$) during desorption of Na to obtain reversible capacitance of 110 mAh/g as Na desorption capacitance. On the other hand, as shown in FIG. 6B, in Example 2, it was confirmed that reaction potential in accordance with the Li desorption reaction appeared in the vicinity of 1.5 V (vs Li/Li$^+$) during desorption of Li to obtain reversible capacitance of 156 mAh/g as Li desorption capacitance. Also, it may be confirmed from the results of the charge and discharge test that the active material having the $H_4Nb_6O_{17}$ phase is useful as an anode active material of a lithium ion battery.

Figure 7A:
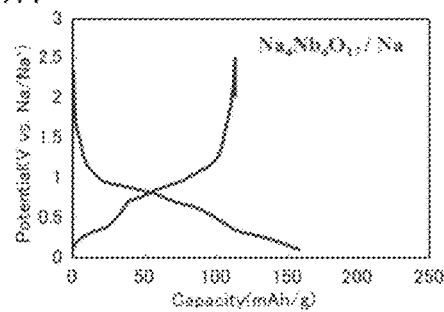
FIGS. 7A and 7B are each a result of a charge and discharge test of an evaluation battery (a sodium ion battery and a lithium ion battery) using an active material obtained in Example 3.
Figure 7B:
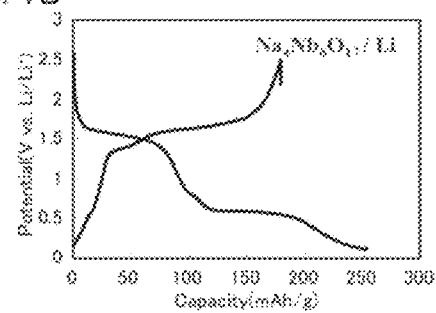

As shown in FIG. 7A, in Example 3, it was confirmed that reaction potential in accordance with the Na desorption reaction appeared in the vicinity of 0.8 V (vs Na/Na$^+$) during desorption of Na to obtain reversible capacitance of 113 mAh/g as Na desorption capacitance. On the other hand, as shown in FIG. 7B, in Example 3, it was confirmed that reaction potential in accordance with the Li desorption reaction appeared in the vicinity of 1.6 V (vs Li/Li$^+$) during desorption of Li to obtain reversible capacitance of 178 mAh/g as Li desorption capacitance. Also, it may be confirmed from the results of the charge and discharge test that the active material having the $Na_4Nb_6O_{17}$ phase is useful as an anode active material of a lithium ion battery.

Also, a relation between ionic radius of an A element (A=H, Na and K) and reversible capacitance of an active material obtained in Examples 1 to 3 is shown in Table 1 and FIG. 8.

TABLE 1

|  | Crystal Phase | A Element | Counter Electrode | Ionic Radius (Å) | Reversible Capacitance (mAh/g) |
|---|---|---|---|---|---|
| EXAMPLE 1 | $K_4Nb_6O_{17}$ | K | Na | 1.38 | 84 |
| EXAMPLE 2 | $H_4Nb_6O_{17}$ | H | Na | 0.37 | 110 |
| EXAMPLE 3 | $Na_4Nb_6O_{17}$ | Na | Na | 1.02 | 113 |
| EXAMPLE 1 | $K_4Nb_6O_{17}$ | K | Li | 1.38 | 84 |
| EXAMPLE 2 | $H_4Nb_6O_{17}$ | H | Li | 0.37 | 156 |
| EXAMPLE 3 | $Na_4Nb_6O_{17}$ | Na | Li | 1.02 | 178 |

Figure 8A:
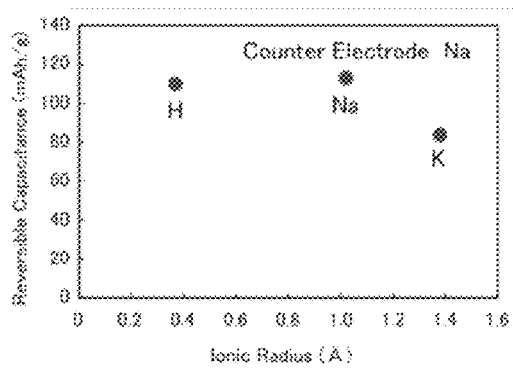
FIGS. 8A and 8B are each a graph showing a relation between ionic radius of an A element (A=H, Na and K) and reversible capacitance in an evaluation battery (a sodium ion battery and a lithium ion battery) using an active material obtained in Examples 1 to 3.
Figure 8B:
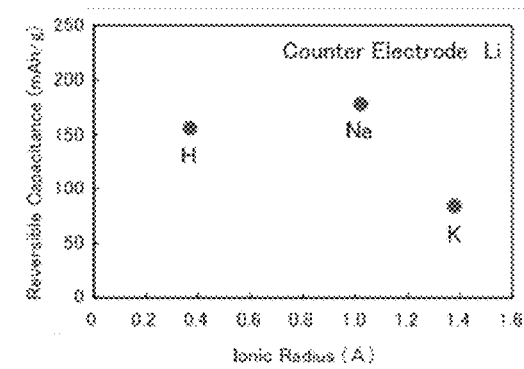

As shown in Table 1 and FIGS. 8A and 8B, it was confirmed that reversible capacitance increased by substituting the K element of $K_4Nb_6O_{17}$ of Example 1 with an H element and an Na element with smaller ionic radius. A mechanism of an increase in reversible capacitance by smaller ionic radius is probably guessed to be such that Na insertion sites and Li insertion sites in a zigzag interlayer formed by the $NbO_6$ octahedron increased.

Also, in Example 2, reversible capacitance increased from Example 1 whereas reversible capacitance decreased slightly as compared with Example 3. The reason therefor is guessed to be that Na ions and Li ions in Example 2 were stably inserted into sites different from Examples 1 and 3. Incidentally, a plateau was confirmed in the vicinity of 2 V in FIGS. 6A and 6B, and there is a possibility that this plateau exhibits a reaction in the sites different from Examples 1 and 3.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . sodium ion battery or lithium ion battery

What is claimed is:

1. An anode active material being used for a sodium ion battery or a lithium ion battery, wherein the anode active material has an $A_4Nb_6O_{17}$ phase, and A is Na or H.

2. A sodium ion battery comprising:
a cathode active material layer containing a cathode active material,
an anode active material layer containing an anode active material, and
an electrolyte layer formed between the cathode active material layer and the anode active material layer,
wherein the anode active material has an $A_4Nb_6O_{17}$ phase, and A is at east one selected from the group con consisting of H, Na, and K.

3. A lithium ion battery comprising:
a cathode active material layer containing a cathode active material,
an anode active material layer containing an anode active material, and
an electrolyte layer formed between the cathode active material layer and the anode active material layer,
wherein the anode active material has an $A_4Nb_6O_{17}$ phase, and A is as east one selected from the group consisting of H, Na, and K.

* * * * *